(12) United States Patent
Lai

(10) Patent No.: US 8,310,227 B2
(45) Date of Patent: Nov. 13, 2012

(54) ELECTRONIC MEASURING WHEEL

(75) Inventor: Ying-Wu Lai, Taichung (TW)

(73) Assignee: Cheng-Lin Wang, Tongluo Hsiang, Miaoli Hsien (TW)

(*) Notice: Subject to any disclaimer, the term of this patent is extended or adjusted under 35 U.S.C. 154(b) by 536 days.

(21) Appl. No.: 12/565,229

(22) Filed: Sep. 23, 2009

(65) Prior Publication Data

US 2011/0068778 A1 Mar. 24, 2011

(51) Int. Cl.
*G01B 7/04* (2006.01)
*G01B 7/30* (2006.01)
*G01B 5/00* (2006.01)

(52) U.S. Cl. .............. 324/207.25; 324/166; 33/780

(58) Field of Classification Search .......... None
See application file for complete search history.

(56) References Cited

U.S. PATENT DOCUMENTS

| | | | | |
|---|---|---|---|---|
| 3,673,693 A * | 7/1972 | Evans, Jr. | | 33/781 |
| 3,696,510 A * | 10/1972 | Evans, Jr. | | 33/781 |
| 3,791,038 A * | 2/1974 | Polydoris et al. | | 33/780 |
| 4,276,695 A * | 7/1981 | Stansbury, Jr. | | 33/781 |
| 5,035,064 A * | 7/1991 | Care | | 33/760 |
| 5,052,687 A * | 10/1991 | Katerba | | 473/150 |
| D486,406 S * | 2/2004 | Critelli et al. | | D10/70 |
| 7,040,036 B1 * | 5/2006 | Wang | | 33/782 |

* cited by examiner

*Primary Examiner* — Paresh Patel
(74) *Attorney, Agent, or Firm* — Burr & Brown

(57) ABSTRACT

An electronic measuring wheel has a casing, a distance wheel and an operating shaft. The casing has a power supply, a seven-segment display and a sensor. The seven-segment display is mounted in the casing and is electrically connected to the power supply. The sensor is mounted on the seven-segment display in the casing and is electrically connected to the power supply and the seven-segment display. The distance wheel is rotatably connected to the casing and has a distance wheel axle and an induction ring. The distance wheel axle has an inner end mounted in the casing. The induction ring is mounted around the inner end of the distance wheel axle near the sensor. The operating shaft is connected to the casing.

3 Claims, 4 Drawing Sheets

ELECTRONIC MEASURING WHEEL

BACKGROUND OF THE INVENTION

1. Field of the Invention

The present invention relates to an electronic measuring wheel, and more particularly relates to an electronic measuring wheel that can provide a high brightness and a breakage-proof effect.

2. Description of Related Art

With reference to FIG. 4, a conventional electronic measuring wheel (50) is used to measure a distance between two objects and has a casing (51), a distance wheel (52) and an operating shaft (53). The casing (51) has a chamber, a top surface, a window, a sensor (54), a liquid crystal display (55) and a power supply (56). The window is formed in the top surface of the casing (51) and communicates with the chamber of the casing (51). The sensor (54) is mounted in the chamber of the casing (51). The liquid crystal display (55) is mounted in the casing (51) near the window and is electrically connected to the sensor (54). The power supply (56) is mounted in the chamber of the casing (51) near the liquid crystal display (55) and is electrically connected to the sensor (54) and the liquid crystal display (56). The distance wheel (52) is rotatably connected to the casing (51) and has a distance wheel axle (521) extending into the chamber of the casing (51) near the sensor (54). The operating shaft (53) is connected to the top surface of the casing (51).

The conventional electronic measuring wheel (50) can provide a distance measurement effect by the rotation of the distance wheel axle (521) of the distance wheel (52) relative to the casing (51). The liquid crystal display (55) has a glass cover to show the measurement data. However, the glass cover of the liquid crystal display (55) may easily be broken and the measurement data on the glass cover cannot be seen easily under bright lighting, such as under sunshine. To clearly see the measurement data on the glass cover of the liquid crystal display (55), the liquid crystal display (55) has to be shaded so is inconvenient to use. Furthermore, when the liquid crystal display (55) is exposed to water, water may flow under the glass cover and into the liquid crystal display (55) causing short circuit and breakage or obscuring the display (55). Therefore, the glass cover of the liquid crystal display (55) cannot provide a waterproof effect and this will increase the cost of using the conventional electric range finder (50).

Therefore, the present invention provides an electronic measuring wheel to mitigate or obviate the aforementioned problems.

SUMMARY OF THE INVENTION

The main objective of the present invention is to provide an electronic measuring wheel that can provide a high brightness and a breakage-proof effect.

The electronic measuring wheel in accordance with the present invention has a casing, a distance wheel and an operating shaft. The casing has a power supply, a seven-segment display and a sensor. The seven-segment display is mounted in the casing and is electrically connected to the power supply. The sensor is mounted on the seven-segment display in the casing and is electrically connected to the power supply and the seven-segment display. The distance wheel is rotatably connected to the casing and has a distance wheel axle and an induction ring. The distance wheel axle has an inner end mounted in the casing. The induction ring is mounted around the inner end of the distance wheel axle near the sensor. The operating shaft is connected to the casing.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
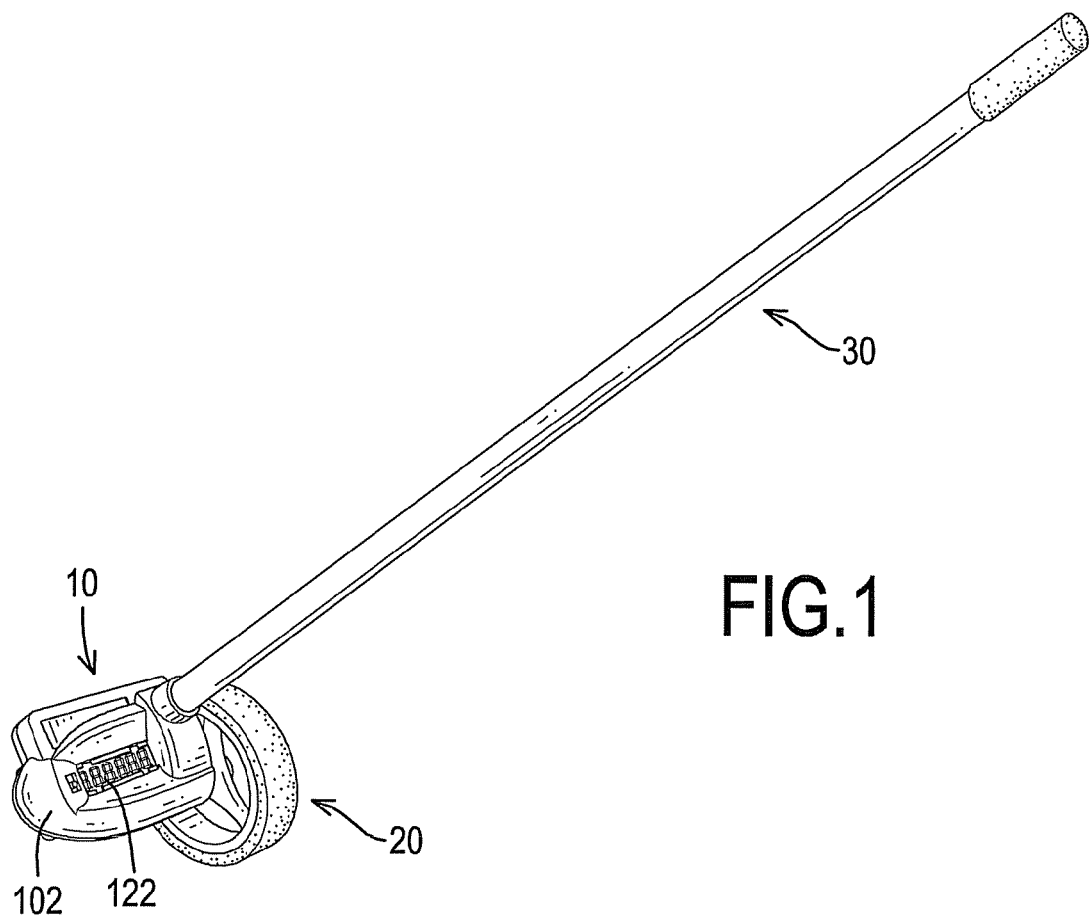
FIG. 1 is a perspective view of an electronic measuring wheel in accordance with the present invention.
Figure 2:
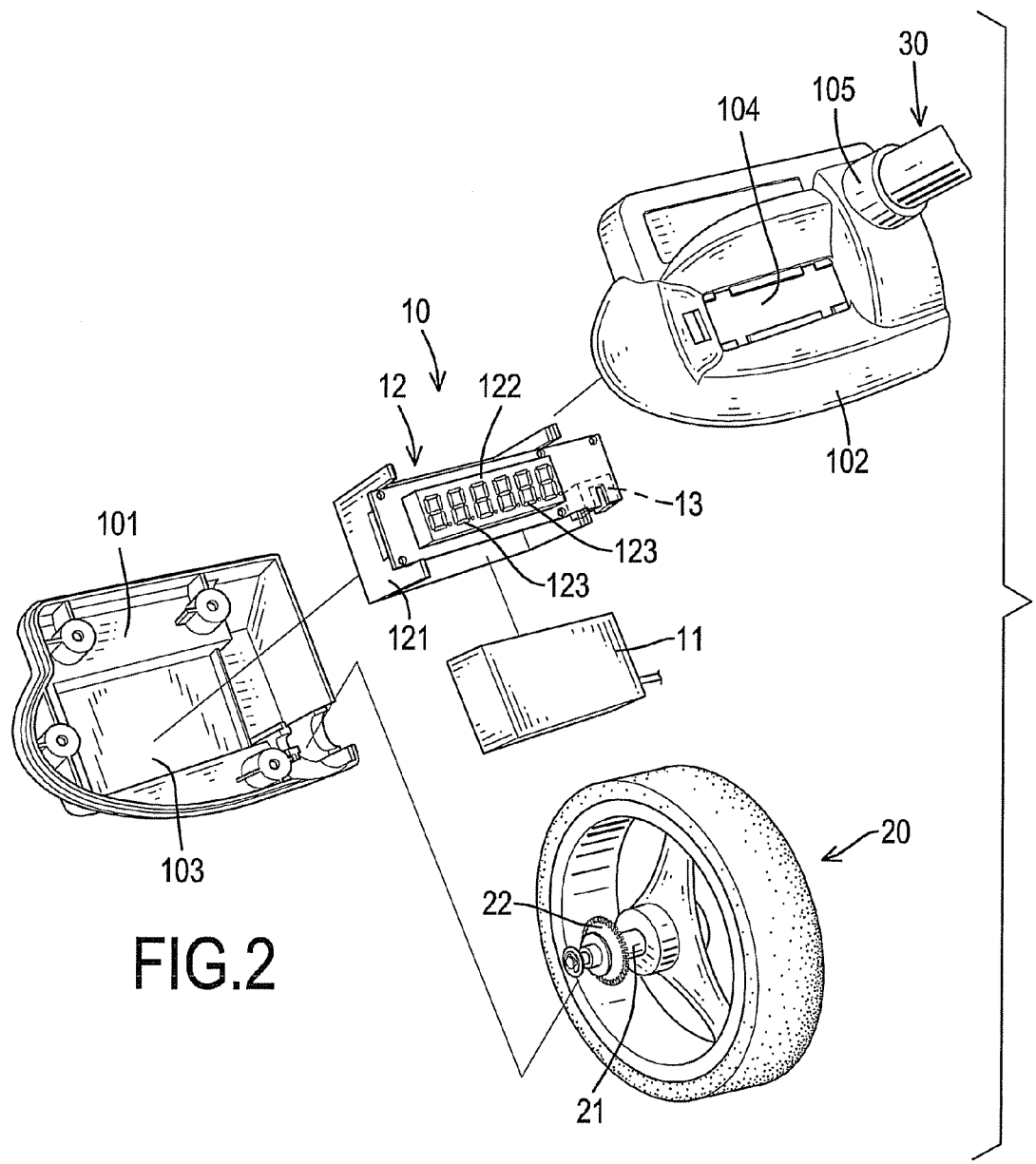
FIG. 2 is an enlarged exploded perspective of the electronic measuring wheel in FIG. 1.
Figure 3:
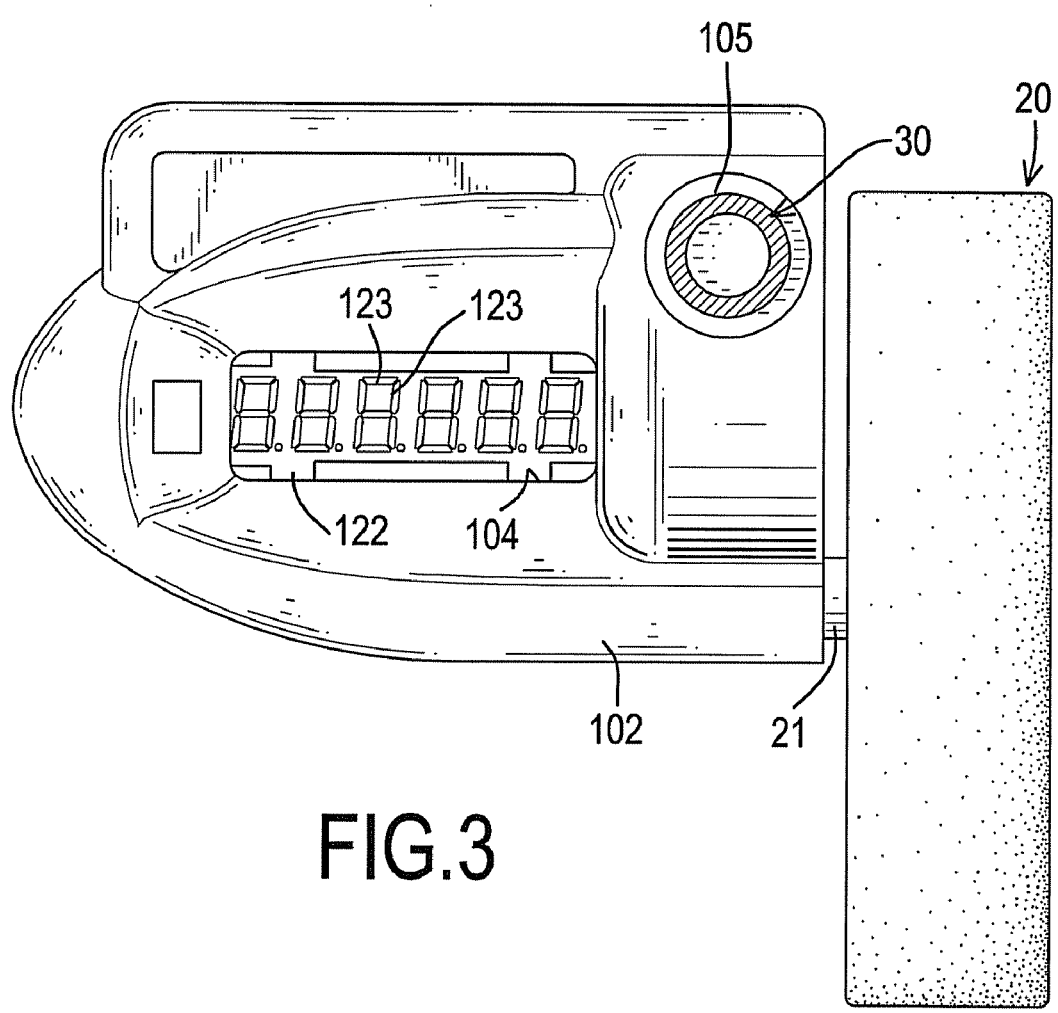
FIG. 3 is an enlarged top view in partial section of the electronic measuring wheel in FIG. 1.
Figure 4:
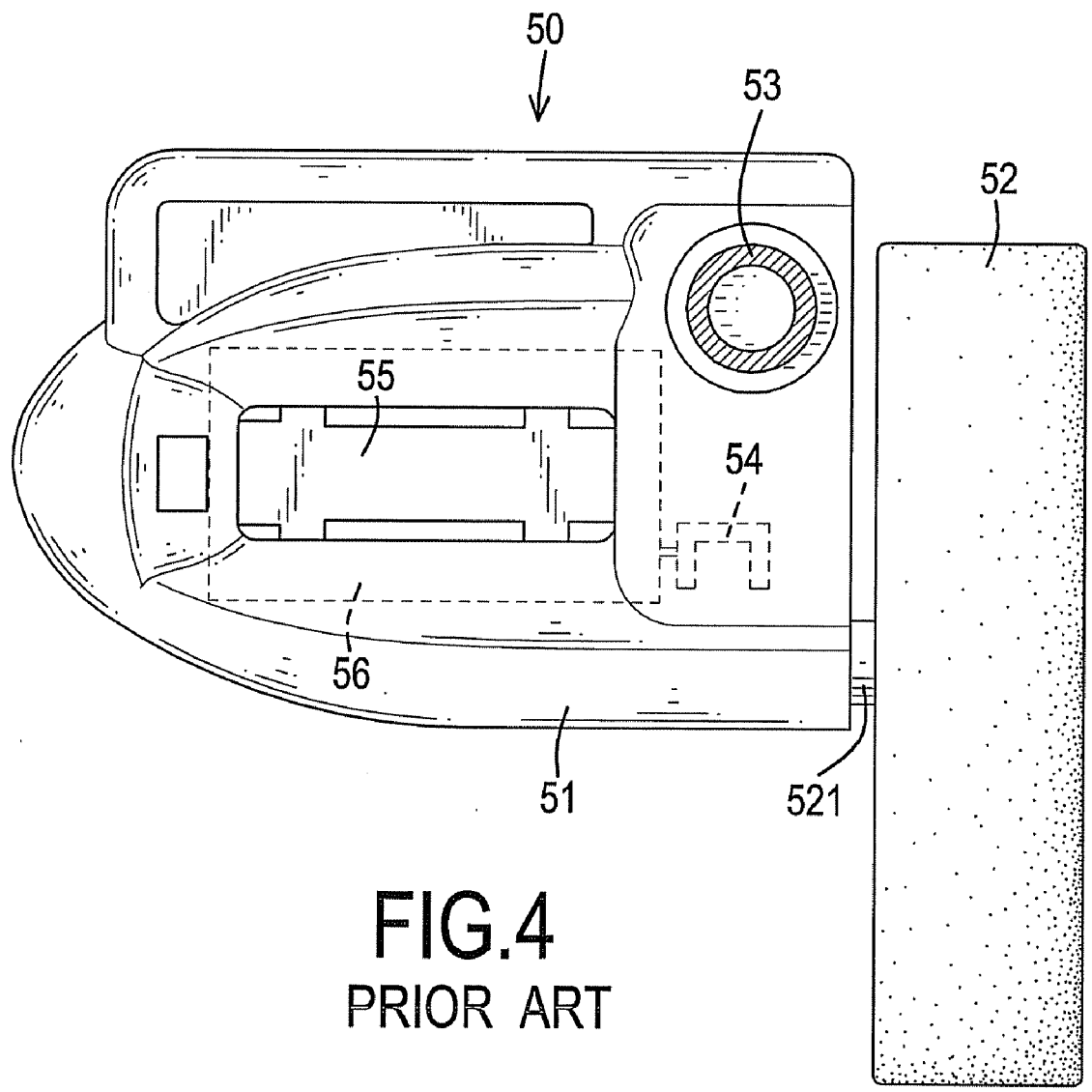
FIG. 4 is a top view in partial section of an electronic measuring wheel in accordance with the prior art.

With reference to FIGS. 1, 2 and 3, an electronic measuring wheel in accordance with the present invention has a casing (10), a distance wheel (20) and an operating shaft (30).

The casing (10) may be composed of two half-casings (101, 102) and has a power supply (11), a seven-segment display (12) and a sensor (13). The half-casings (101, 102) are combined with each other and have a lower half-casing (101) and an upper half-casing (102). The lower half-casing (101) has a mounting recess (103). The upper half-casing (102) is detachably combined with the lower half-casing (101) and has a top surface, a window (104) and a mounting tube (105). The window (104) is formed through the top surface of the upper half-casing (102) and communicates with the mounting recess (103) of the lower half-casing (101). The mounting tube (105) is formed on and protrudes from the top surface of the upper half-casing (102).

The power supply (11) is mounted in the casing (10) and may be a battery.

The seven-segment display (12) is mounted in the casing (10), is electrically connected to the power supply (11) and may have a mounting frame (121) and a panel board (122). The mounting frame (121) is mounted in the mounting recess (103) of the lower half-casing (102), holds the power supply (11) inside and has a top side and a sidewall. The panel board (122) is mounted on the top side of the mounting frame (121) near the window (104) of the upper half-casing (102), is electrically connected to the power supply (11) and has an outer surface and multiple seven segments. The outer surface of the panel board (122) is mounted in the window (104) of the upper half-casing (102). The seven segments are mounted on the outer surface of the panel board (122) and each seven segment has seven light-emitting diodes (123) to show a number.

The sensor (13) is mounted on the sidewall of the mounting frame (121) in the casing (10) and is electrically connected to the power supply (11) and the board panel (122).

The distance wheel (20) is rotatably connected to the casing (10) and has a center, a distance wheel axle (21) and an induction ring (22). The distance wheel axle (21) is mounted on and protrudes from the center of the distance wheel (20) and has an inner end mounted in the casing (10) between the half-casings (101, 102). The induction ring (22) is mounted around the inner end of the distance wheel axle (21) near the sensor (13).

The operating shaft (30) is connected to the casing (10) and has a mounting end mounted in the mounting tube (105) of the upper half-casing (102).

With further reference to FIGS. 2 and 3, to measure a distance with the electronic measuring wheel in accordance with the present invention, the operating shaft (30) is held to move the casing (10) and rotate the distance wheel (20) relative to the casing (10). Consequently, the induction ring (22) on the inner end of the distance wheel axle (21) will rotate relative to the sensor (13), and the sensor (13) can calculate the distance by the rotation of the distance wheel (20) and send a signal to the seven-segment display (12). The light-emitting diodes (123) of the seven segments on the panel board (122) can show the measure data corresponding to the distance detected by the sensor (13).

In the invention, the panel board (122) of the seven-segment display (12) is not made of glass and this can prevent the panel board (122) from breaking. Furthermore, the light-emitting diodes (123) of the seven segments on the outer surface of the panel board (122) can are brighter than the liquid crystal display (55) of the conventional electric range finder (50) so the measure data can be viewed easily on the panel board (122), despite background brightness, such as under strong sunshine. In addition, when the casing (10) in accordance with the present invention is exposed to water, water can not flow into the seven-segment display (12) of the casing (10). The measurement data can be shown by the light-emitting diodes (123) and this can provide a waterproof effect and will decrease the cost of using the electric range finder.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electronic measuring wheel having:
    a casing being composed of a lower half-casing with a mounting recess and an upper half-casing, and having:
      a power supply mounted in the casing;
      a seven-segment display mounted in the casing and electrically connected to the power supply and having:
        a mounting frame mounted in the mounting recess of the lower half-casing to hold the power supply inside and having a top side and a sidewall;
        a panel board mounted on the top side of the mounting frame near the window of the upper half-casing, electrically connected to the power supply; and
        multiple seven segments; and
      a sensor mounted on the sidewall of the mounting frame of the seven-segment display in the casing and electrically connected to the power supply and the board panel of the seven-segment display;
    wherein the upper half-casing is detachably connected to the lower half-casing and has:
      a top surface;
      a window formed through the top surface of the upper half-casing and communicating with the mounting recess of the lower half-casing; and
      a mounting tube formed on and protruding from the top surface of the upper half-casing;
    a distance wheel rotatably connected to the casing and having:
      a center;
      a distance wheel axle mounted on and protruding from the center of the distance wheel and having an inner end mounted in the casing between the half-casings; and
      an induction ring mounted around the inner end of the distance wheel axle near the sensor; and
    an operating shaft connected to the casing and having a mounting end mounted in the mounting tube of the upper half-casing.

2. The electronic measuring wheel as claimed in claim 1, wherein the panel board has
    an outer surface mounted in the window of the upper half-casing; and
    each seven segment of the seven-segment display has seven light-emitting diodes mounted on the outer surface of the panel board.

3. The electronic measuring wheel as claimed in claim 1, wherein
    the panel board has an outer surface; and
    each seven segment of the seven-segment display has seven light-emitting diodes mounted on the outer surface of the panel board.

* * * * *